United States

Beckwith

4,031,373

June 21, 1977

[54] VELOCITY COMPUTING CHRONOGRAPH

[76] Inventor: Robert Beckwith, R.R. 1, Box 1058, Marathon, Fla. 33050

[22] Filed: June 1, 1976

[21] Appl. No.: 691,327

[52] U.S. Cl. .......................... 235/151.32; 324/178; 235/92 BD; 250/222 R; 235/92 T

[51] Int. Cl.² .................. G01N 23/10; G06M 3/06

[58] Field of Search ....... 235/151.32, 92 T, 92 DN, 235/92 BD, 151.3; 324/160, 175, 178, 79; 356/28; 250/222 R

[56] References Cited

UNITED STATES PATENTS

| | | | |
|---|---|---|---|
| 3,127,768 | 4/1964 | Mason | 324/179 X |
| 3,215,932 | 11/1965 | Sims et al. | 324/179 |
| 3,567,951 | 3/1971 | Montgomery, Jr. et al. | 250/222 R |
| 3,610,895 | 10/1971 | Wollesen | 235/92 T X |
| 3,750,019 | 7/1973 | Blanyer | 324/178 |
| 3,787,770 | 1/1974 | Cote et al. | 324/178 |
| 3,792,354 | 2/1974 | Slaght et al. | 324/178 |
| 3,824,463 | 7/1974 | Oehler | 324/179 |
| 3,859,512 | 1/1975 | Ritzinger | 235/151.3 |

*Primary Examiner*—Edward J. Wise
*Attorney, Agent, or Firm*—Jack D. Slobod

[57] ABSTRACT

A velocity computing chronograph includes a chain of BCD counter stages having a clock input signal gated via the outputs from a pair of spaced apart photo-electric screens for measuring the time of flight of a bullet between the screens. BCD coded numerical switches are provided for the manual entry of the distance between the screens. A multiplexer serially applies the BCD digit signals first from the numerical switches and thereafter from the counter stages to the BCD data digit input of an integrated circuit calculator chip. The calculator circuit has divide and equal command input terminals which are driven automatically at appropriate times for the projectile velocity to be computed in the calculator circuit and display on an LED display driven thereby.

1 Claim, 1 Drawing Figure

VELOCITY COMPUTING CHRONOGRAPH

FIELD OF THE INVENTION

The present invention relates generally to devices for measuring and computing the velocity of a projectile passing serially through a pair of sensing screens separated by a determinable distance. In its particular aspects the present invention relates to a device for measuring the time of flight of the projectile between screens which includes a logic interface to an integrated circuit calculator for performing the necessary division between a distance member entered manually into the device and the measured time of flight.

BACKGROUND OF THE INVENTION

Available velocity computing chronographs are considerably more expensive than those which only measure the time of flight of a projectile. In the field of electronic calculators, there have been considerable strides made which now permit the existance of very inexpensive single large scale integrated circuit chips which together with a keyboard and digital display form a calculator. If a velocity computing chronograph could be fashioned utilizing a simple interface with one of these calculator chips there would result considerable cost savings.

OBJECTS OF THE INVENTION

It is an object of the present invention to provide a velocity computing chronograph utilizing a calculator integrated circuit for the division operation necessary in determining velocity.

It is a further object of the present invention to provide a velocity computing chronograph in which a calculator integrated circuit is interfaced for automaticaly receiving first the digits making up a manually entered number representing the distance between a pair of screen sensors, then a divide command, then the digits making up a measured time interval of passage of a projectile between the screens and then an equal command.

SUMMARY OF THE INVENTION

Briefly, the aforementioned and other objects of the present invention are satisfied by providing a projectile velocity measuring and computing apparatus including a pair of spaced apart projectile sensing screens. The outputs of the screens are applied to flip-flop means for producing a signal for gating a first oscillator for clocking a chain of BCD counter stages only during the time of flight of the projectile between the screens. A group of BCD coded numerical switches are provided for manual entry of the distance between the screens.

A digital calculator large scale integrated circuit is provided driving an LED numerical display. The calculator circuit has data input terminals for serially receiving BCD digits, a divide command input terminal and an equals command input terminal.

Means including a second oscillator and binary counter are provided for generating a series of binary coded sequential control signals. The digit outputs of the numerical switches and the BCD counter chain are applied to a multiplexer means which feeds the data input terminals of the calculator circuit.

The multiplexer is controlled by the aforementioned control signals and is organized and connected for first applying the digits from the numerical switches and then the digits from the counter chain to the calculator. There is a one to one correspondence between a BCD digit and a control signal state.

At least one control signal state exists between the application of digits from the switches and from the counter chain. Means are provided responsive to this state for driving the divide command upon its occurrence. Further a means responsive to a last one of the control signals drives the equals command terminal.

Thus, the calculator is in effect controlled electrically automatically in a simple interface for achieving a simple and inexpensive design.

Other objects, features and advantages of the present invention will become apparent upon perusal of the following detailed description of the preferred embodiment thereof when taken in conjunction with the appended drawing wherein:

FIG. 1 is an electrical schematic of the velocity computing chronograph of the present invention.

DETAILED DESCRIPTION

Figure 1:
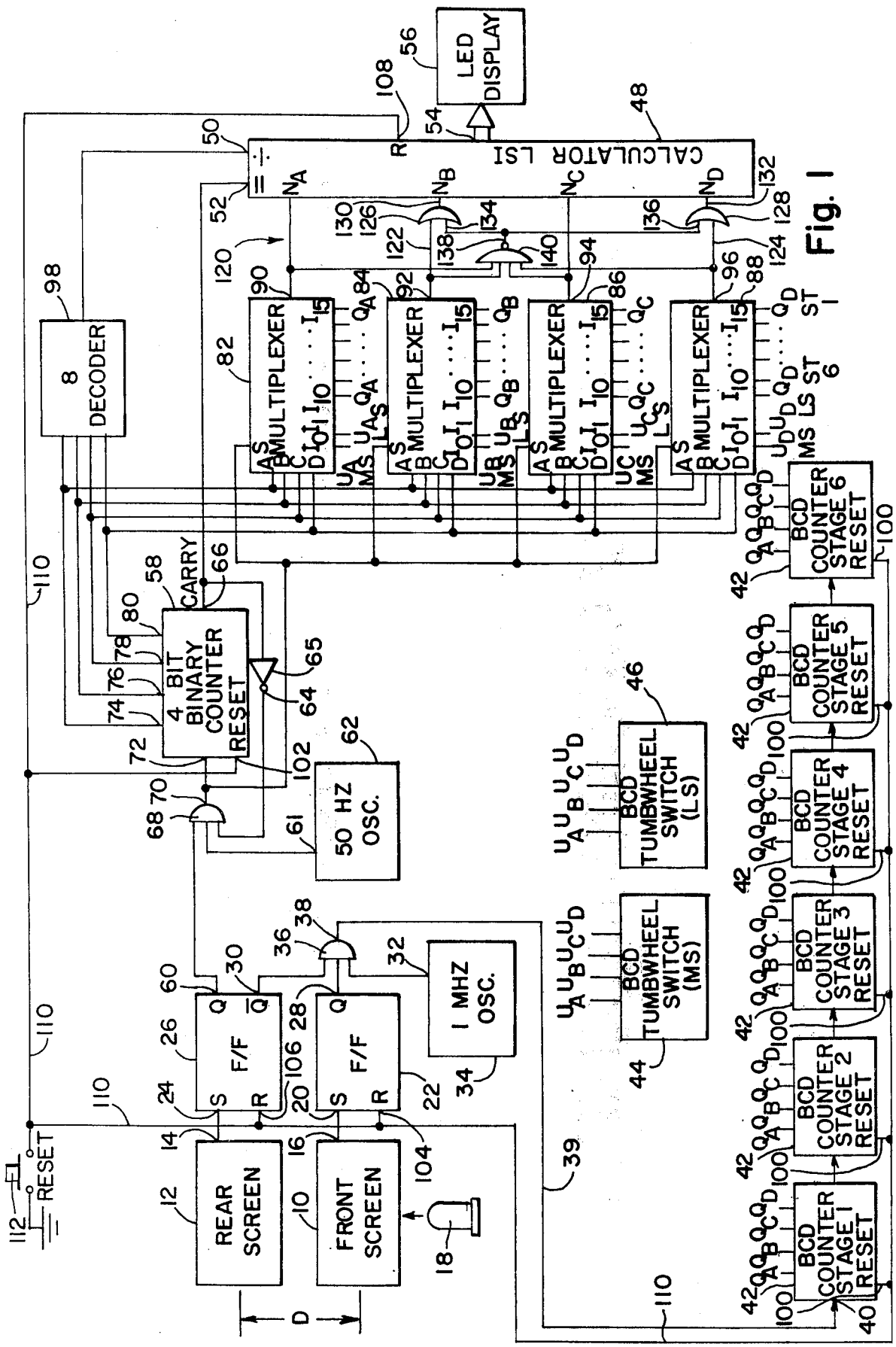

Referring to FIG. 1 of the drawing the velocity computing chronograph of the present invention utilizes a pair of available photo-electric or paper projectile sensing screens 10 and 12 for producing output pulses on their respective output lines 14 and 16 upon the passage of a bullet 18 sequentially therethrough.

The front screen 10, or screen first encountered by bullet 18, has its output 16 connected to the set input 20 of a flip flop 22 for setting the flip flop upon the detection of bullet 18. Similarly, the rear screen 12 has its output 14 connected to the set input 24 of another flip-flop 26. The Q output 28 of flip-flop 22, the Q NOT output 30 of flip-flop 26 and the output 32 of a 1 Megahertz oscillator 34 form the three inputs of an AND gate 36. As a result, the output 38 of AND gate 36 has clock pulses only during the time of flight of bullet 18 between the front screen 10 and rear screen 12.

Output 38 is applied via line 39 to the clock input 40 of a chain of BCD counter stages 42 for counting the number of microseconds between the setting of flip-flop 22 and the setting flip-flop 26. Preferably there are six stages 42 which permits measuring a time of flight of bullet 18 between screens 10 and 12 of up to 1 second. As is usual, each stage 42 has four binary ouput terminals, labelled $Q_A$ through $Q_D$ or expressing the BCD digit contained in the stage. The sixth one of stages 42 which is most removed from clock input 40 contains the most significant BCD digit while the first of stages 42 which is closest to input 40 contains the least significant digit.

For manual entry of the distance D, for example in feet, between screens 10 and 12 a pair BCD coded thumbwheel switches 44 and 46 are provided respectively for most significant and least significant digits. Each of switches 44 and 46 has four binary output lines $U_A$ through $U_D$ for expressing digits in BCD form.

The division operation between the contents of numerical switches 44, 46 as numerator and the contents of counter stages 42 as denominator is performed in a single large scale integration calculator chip 48 such as the Cal-Tex CT 5001. Chip 48 is of the type forming the heart of an electronic calculator. It includes data input terminals $N_A$ through $N_D$ for receiving the BCD code of a digit, a divide command terminal 50, an equals command terminal 52 and output terminals 54 for driving an LED numerical display 56 with the results of its computation. This type of chip is currently quite inexpensive because of its mass production. It is interfaced in the velocity computing chronograph of the present invention to produce a simple and inexpensive design.

Digital and command information is applied to chip 48 in the sequence that would be followed if a keyboard were utilized. For generating the time for this sequence of information a four bit binary counter 58 is utilized. The Q output 60 of flip-flop 26, the output 61 of a fifty hertz oscillator 62 and the output 64 of an inverter 65 fed by the carry or overflow output 66 of counter 58 form the three inputs to an AND gate 68. The output 70 of gate 68 feeds the clock input 72 of counter 58. Upon the flip-flop 26 being set, 16 clock pulses will be gated through gate 68 from oscillator 62. At the sixteenth pulse, the carry output 66 of counter 58 will be digital one and will block any further passage of clock pulses through gate 68 until the counter 58 is reset. As a result the four digital output lines 74, 76, 78 and 80 of counter 58 will go through a series of sequential states or numbers which will function as control signals.

Output lines 74–80 are coupled respectively to the four control inputs A, B, C and D of each of four multiplexers 82, 84, 86 and 88.

The multiplexers 82–86 respectively have single output terminals 90, 92, 94 and 96 which are in turn respectively connected to data input terminals $N_A$ through $N_D$ of chip 48. Thus each multiplexer conveys a different bit to chip 48. Multiplexers 82–86 further have strobe inputs, labelled S, which are each connected to the output 70 of gate 68 to enable data transfer on each of the aforementioned 16 clock pulses reaching counter 58.

If calculator chip 48 is of the type which is not responsive to a BCD zero input, it is necessary to utilize a signal conditioner 120 interposed between the multiplexer outputs 90–96 and the chip data inputs $N_A - N_D$ to convert the BCD zero to a BCD 10. To this end, the least significant multiplexer output 90 and the third least significant multiplexer output 94 are directly connected to the respective data inputs $N_A$ and $N_C$. The second least significant and most significant multiplexer outputs 92 and 96 are connected respectively to inputs 122, 124 of OR gates 126, 128. The outputs 130, 132 of the respective OR gates 126, 128 are connected respectively to data inputs $N_B$ and $N_D$ of chip 48. The other inputs 134, 136 of OR gates 126, 128 are driven by the output 138 of a four-input NOR gate 140 which is fed by each of the multiplexer outputs 90–94 and consequently has a digital one output only when the multiplexer outputs represent a BCD zero. This digital one state of output 138 forces the OR gate outputs 130, 132 to digital one to indicate a BCD 10.

Each of the multiplexers 82 to 88 has 16 data inputs labelled $I_0$ through $I_{15}$; $I_2 - I_9$ are not used however in the present invention. In each multiplexer, upon the application of a pluse to strobe input S, the number represented by the binary code on control inputs A–D determines which of $LI_0 - I_{15}$ is gated through to the output of the multiplexer. Specifically, I sub, is the number gated through to the output of the multiplexer.

In multiplexer 82, $I_0$ is fed by the $U_A$ output of switch 44, $I_1$ is fed by the $U_A$ output of switch 46, and $I_{10} - I_{15}$ are respectively fed by the $Q_A$ outputs of stage 6 through stage 1. The connections of multiplexers 92–96 are similar involving only different bits of significance. Thus, since the digital codes on control lines A–D represent sequential numbers in view of the operation of counter 58, the outputs of switch 44 will first be applied to calculator chip 48. Next the outputs of switch 46 will be applied. Thereafter, there will be a series of control signals representing the numbers 2–9 in which there will be no data transfer to calculator chip 48.

For driving the divide command input 50 of chip 48 after the distance information from switches 44, 46 has been loaded in the chip, a decoder 98 is provided fed by counter outputs 74–80. Decoder 98 is configured to detect the occurrence of the code for the number 8 and to drive input 50 at that time.

Thereafter, upon occurrence of the digital codes for numbers 10–15 on lines A–D the BCD outputs of counter stages 42 are sequentially loaded most significant bit first. For driving the equals command input 52 at the conclusion of the loading of the time of flight information from the BCD counter chain, the carry output 66 is connected to line 52. This action causes the computed velocity to appear on display 56.

In preparation for a new measurement and computation, it is necessary to reset various components. To this end, the reset inputs 100 of stages 42, 102 of counter 58, 104 of flip-flop 22, 106 of flip-flop 26 and 108 of chip 48 are each connected to a bus 110 which is selectively coupled to ground via a momentary push button switch 112.

While the preferred embodiment of the present invention has been described in specific detail it should be understood that numerous modifications, additions and omissions in the details thereof are possible within the intended spirit and scope of the invention claimed herein.

What is claimed is:

1. A projectile velocity measuring and computing system having front and rear projectile sensing screens having outputs indicative of the passage of a projectile therethrough the apparatus comprising: a first oscillator; a chain of BCD counter stages; means responsive to the outputs of said screens for coupling said oscillator for clocking said chain of counters only during the time of flight of said projectile from the front to the rear screen means; a group of BCD coded numerical switches for manual entry of the distance between said pair of screens; an electronic digital display; a digital calculator integrated circuit having data input terminal means for serially receiving BCD digit signals, a divide command input terminal, an equals command input terminal and output means for driving said electronic digital display with the result of computation in said calculator means; means responsive to the output of said rear screen including a second oscillator and a binary counter for deriving a series of binary coded sequential numerical control signals after the flight of said projectile between said front and rear screen means; multiplexer means fed by BCD digit output signals from said BCD counter stages and numerical switches and feeding said data input terminal means of said calculator means for selectively applying different ones of said BCD digit output signals to said data input terminal means in response to the digital state of said numerical control signals, said multiplexer means being organized for serially applying first said BCD digit signals from said numerical switches and then from said BCD counter stages in response to the sequential numerical control signals, there being at east one predetermined numerical control signal state between the application of said BCD digit signals from said BCD coded numerical switches and from said BCD counter stages; means responsive to said predetermined control signal state for driving said divide command input terminal; and means responsive to the occurrence of a last of said numerical control signals for driving said equals command input terminal.

* * * * *